United States Patent

Bieser

[15] 3,671,717

[45] June 20, 1972

[54] CREDIT CARD VERIFICATION SYSTEM

[72] Inventor: Albert H. Bieser, 609 Carroll Drive, Garland, Tex. 75041

[22] Filed: Oct. 24, 1969

[21] Appl. No.: 869,188

[52] U.S. Cl. .................235/61.17B, 235/11, 340/146.3 Z, 340/146.3 AE

[51] Int. Cl. .................G06k 7/04

[58] Field of Search ................235/61.11 Z, 61.7 B, 61.11 R, 235/61.11 C, 61.11 B, 61.12, 61.7 R; 340/149 A, 149, 146.3; 179/2 CA, 2 DP, 90 CS

[56] References Cited

UNITED STATES PATENTS

| | | | |
|---|---|---|---|
| 3,184,714 | 5/1965 | Brown et al. | 340/149 |
| 3,274,345 | 9/1966 | Ham et al. | 179/90 CS |
| 3,514,754 | 5/1970 | Schwend | 340/149 A |
| 3,305,635 | 2/1967 | Kadis | 179/2 DP |
| 3,308,238 | 3/1967 | Brothman et al. | 340/149 |
| 3,184,712 | 5/1965 | Holt | 340/146.3 |

*Primary Examiner*—Maynard R. Wilbur
*Assistant Examiner*—William W. Cochran
*Attorney*—Giles C. Clegg, Jr. and Peter J. Murphy

[57] ABSTRACT

Credit card verification system wherein feelers are used for displaying flags positioned in the path of beams of light which impinge upon photo cells. As the raised characters on an embossed credit card pass beneath the feelers, the flags will be displaced. Movement of the flags is sensed and pulses applied to a transmission line each time the feelers sense a leading edge of a character. The pulses are applied to a bank of shift registers which selectively permit signals of discrete frequencies identified or associated with particular stages of the shift registers to be applied through a summing junction to an operational amplifier. The mixed frequencies produce two sets of chords, one set of which provides horizontal information as to a particular character and the other which provides vertical information as to the character. The unique chord sets representative of each character are detected in a filter-integrator matrix in which amplitude is used to discriminate against extraneous noise. The information is converted to binary form and applied to a computer which can use the information furnished to determine that the card is good or bad and otherwise process the information furnished.

7 Claims, 23 Drawing Figures

INVENTOR.
ALBERT H. BIESER
BY
Gilbert [signature]

INVENTOR.
ALBERT H. BIESER
BY
Gilo B Calegg Jr

INVENTOR.
ALBERT H. BIESER
BY
Gilbert C. Clegg Jr.

INVENTOR.
ALBERT H. BIESER
BY

INVENTOR.
ALBERT H. BIESER
BY

INVENTOR
ALBERT H. BIESER

ATTORNEY

INVENTOR.
ALBERT H. BIESER
BY
Giles C. Clegg Jr.

INVENTOR.
ALBERT H. BIESER
BY
Gil. C. Clagg Jr

INVENTOR.
ALBERT H. BIESER
BY

| | CHORD | * | AMPLITUDE |
|---|---|---|---|
| A | 4 | * | 6 |
| | 4±2 | * | 6 |
| B | 100 | * | 6 |
| | 200 | * | 5 |
| | 300 | * | 4 |
| | 400 | * | 3 |
| | 500 | * | 2 |
| | 600 | * | 1 |

INVENTOR.
ALBERT H. BIESER
BY
Giles C. Clegg Jr.

INVENTOR.
ALBERT H. BIESER
BY
Gil. C. Clyo Jr

CREDIT CARD VERIFICATION SYSTEM

BACKGROUND OF THE INVENTION

A very substantial amount of purchases made in this country are by credit card. However, as credit cards have gained popularity, there has been an increasing amount of monetary losses due to either unauthorized charges made on lost credit cards or charges made by persons whose credit card has been cancelled or revoked but not picked up. Losses also result from instances in which the credit of a customer is limited to an amount commensurate with his ability to pay, but the establishment accepting the credit card permits excessive charges due to lack of knowledge of recent charges or lack of knowledge of the limit imposed on a particular credit card holder.

The losses from credit card operations are now very significant and there is a great need for a credit card verification system which performs the required function very quickly and with a minimum effort on the part of the cashier or operator accepting the credit card. Several systems for verifying credit cards have been instituted. For example, it is common practice for the owners of the credit card to provide lists of bad or stolen card numbers to establishments which accept their credit cards. This system has not proved effective in that the list of bad credit cards becomes very long and it is a time consuming task for the cashier to check this list. Also, it is very easy to overlook a number. This method of credit card verification is, therefore, considered impractical. There has also been some use of central computers for credit card verification and which the operator or cashier can make a telephone call to the central computer and verify a credit card received from a customer. This is a time consuming, expensive process and a severe calling jam is produced at the central computer.

Many other systems have been proposed, some of which have been implemented, such as the use of computers, holographic memories and lasers and ranging down to much less sophisticated systems. However, in general, none of the systems which have been implemented have proved satisfactory from the standpoint of being sufficiently inexpensive to permit widespread use and sufficiently fast in operation that they are practical to utilize.

The present invention provides an improved credit card verification system in which the desired verification is accomplished very rapidly and expediently upon insertion of a credit card into the device used for stamping the card information onto a charge ticket. The card sensing device is connected to a central computer to suitable means such as a telephone line which may be a 50 baud or more line. It will be noted that by using a 50 baud line, the expense of leasing the line is minimized. Further, the apparatus used at the terminal remote from the computer, at which the card is inserted and the actual charging accomplished by the cashier, is relatively simple and inexpensive. It is extremely important that the apparatus used be inexpensive and that the cost of leasing the telephone lines be reduced to a minimal amount in order that the device be practical from an economic standpoint.

In accordance with the preferred embodiment of the present invention, a plurality of feelers are positioned to engage the surface of the credit card having embossed characters thereon. There is also provided means for producing relative movement between the credit card and the feelers with the feelers traversing parallel paths across the characters. In accordance with the preferred embodiment of the invention, the sensor is specially adapted for reading a font, such as the Farrington 7B type, in which the letters are formed on a 7 × 5 matrix. Such fonts are most often used on credit cards. Accordingly, in accordance with the preferred embodiment of the invention, nine feelers are provided with the seven interior feelers scanning the seven horizontal paths and the two exterior feelers being provided to accommodate misalignment of the card. Also provided are means responsive to movement of the feelers as the edge of the embossed characters is sensed for producing output pulses having a known timed relationship. The pulses produced responsive to movement of the feelers are applied to a temporary memory which stores information bits at addresses determined by the time relationship of the pulses and the feeler producing the pulses in a unique pattern associated with a particular character being read. Signal generating means is provided for producing signals of discrete frequencies related to the address at which bits are stored in the temporary memory means. The discrete signals produced at a particular instant are applied to a summing junction at which the discrete frequencies are mixed to produce a unique chord set associated with the character being sensed. Encoder means is provided for providing an output in binary code of the character sensed responsive to the presence of the unique chord sets associated with the character. The binary output can be applied to a computer or other suitable device for assembly of the information received in useable form. Thus, when entire credit card number is received, the computer may check the number of the card against a list of good or bad numbers. If information on the amount of the sale is transmitted to the computer, the computer may also determine if the amount being charged is within the limits of the particular card holder. Billing information and card number can also be applied to a different computer, if desired for purposes of providing billing information and automatically producing statements when desired.

Many objects and advantages of the invention will become apparent to those skilled in the art as a detailed description of a preferred embodiment of the invention unfolds in conjunction with the appended drawings wherein like reference numerals denote like parts.

DESCRIPTION OF THE DRAWINGS

Referring now to FIG. 1 of the drawings, the credit card system of the present invention includes a sensor unit 10 whose output is connected to a voltage and code conversion circuit 12. The voltage and code conversion circuit is connected to a data concentrator 14. If the sensor unit is positioned at a terminal remote from the data concentrator, the interconnection can suitably be made by a fifty baud or more telephone line 16. It will be appreciated, in this connection, that the data concentrator can be connected to additional sensor units by other lines such as the lines 18. The output of the data concentrator is applied to a character recognition unit 20 whose output is in turn applied to a computer 22 having a memory 24 in which there is stored credit card information. Information provided by the computer 22 is applied to the data concentrator 14 for delivery to the voltage and code conversion circuit 12 and, if desired, to a main computer 25. The voltage and code conversion circuit 12 then applies signals to optional devices which may be employed with the sensor unit such as a go/no-go signal light 26, an imprinter 28 and a card collector 32 into which bad cards can be delivered. An amount entry device connected to the voltage and code conversion circuitry for providing information to the computer can be provided.

Figures 1, 4A:
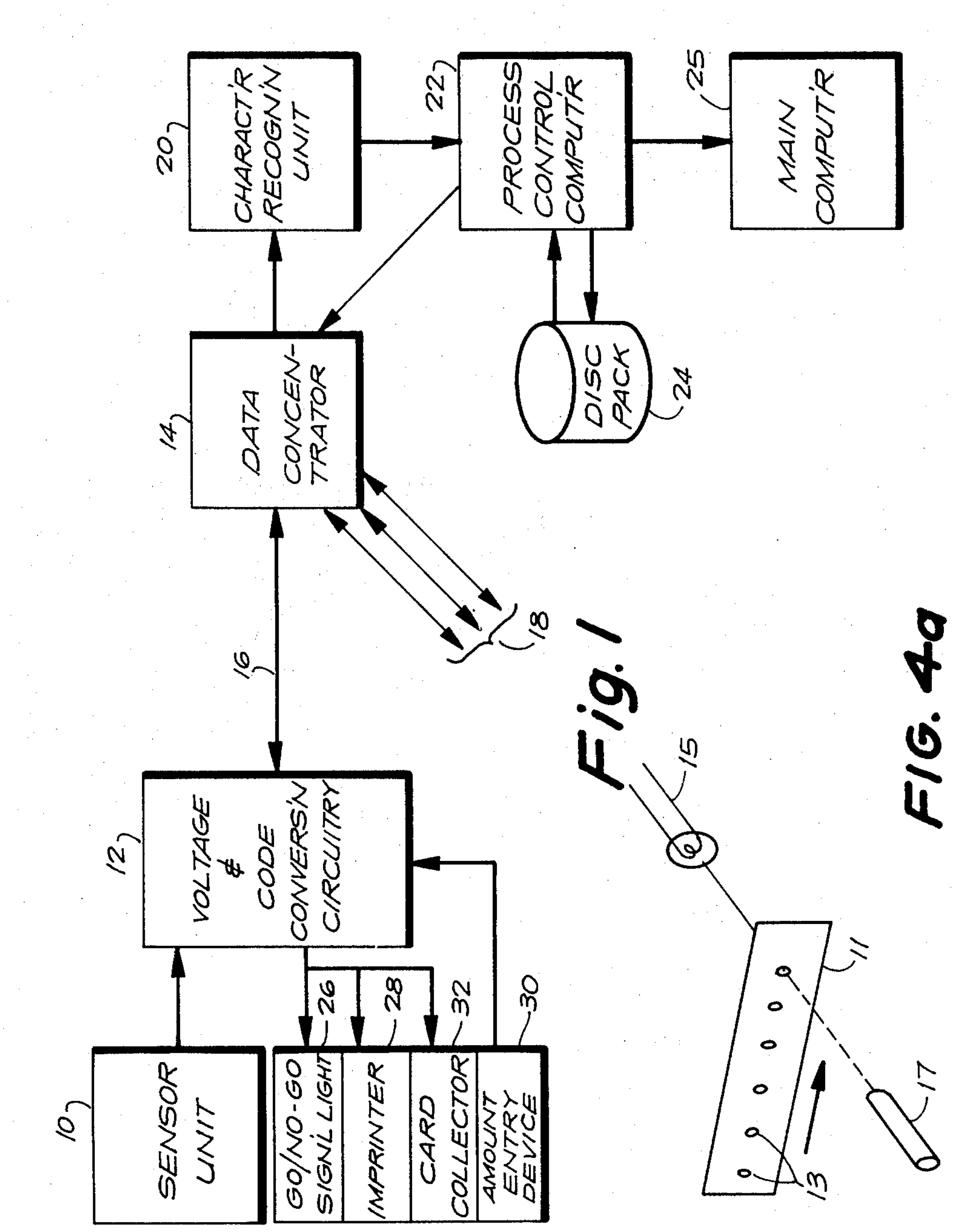
FIG. 1 is a block diagram illustrating a credit card verification system in accordance with the present invention.
FIG. 4*a* is a perspective view illustrating a portion of the sensor for producing clock pulses.

The go/no-go signal light 26, input printer 28, card collector 32 and the amount entry device 30 are all well known devices and, accordingly, a detailed description of them will not be made. Thus, the amount entry device 30 can be nothing more than a standard tone generator similar to those used in modern push button dial systems. Tones would be produced in accordance with the amount of the charge to be made. The amount entry device would be used to send information through the telephone network to the process control computer 22 to indicate the amount of sale against which the credit check is to be performed and also to provide information to the main computer 25 if automatic billing is to be accomplished. The imprinter 28 would also be a conventional unit combined with the amount entry device to write the amount of the sale on a sales ticket or other document in order that the customer and storekeeper may have a printed record of the transaction. The imprinting device could also provide a third copy, if desired, to the agency extending the credit. The card collector 32 could be, for example, a locked box in the bottom of the unit into which bad cards would be dropped for the purpose of removing them from circulation. It would be feasible to permit the drawer to be opened only by a special telephone operator who would manually check the credit and then either inform the terminal operator that the card should be taken up or send a special signal indicating that the system has made a mistake and unlocking the drawer to permit the operator to remove the card and return it to the customer.

The character of the go/no-go signal light 26 would depend to some extent upon the other accessory items used. Thus, if only a card check was to be made, the signal light 26 could include only two lights of different colors, one to indicate that the card was good and the other to indicate the card was bad. If the amount entry device 30 is provided, it is desirable to provide still a third lamp on the signal light 26. One of the lamps would indicate that the card was good and that credit should be accepted. The second lamp would indicate that the card was good but that credit should not be extended as the credit limit would be exceeded. The third lamp could indicate that the card was bad and should be picked up. The third lamp could, of course, be used in conjunction with the card collector 32.

The sensor unit 10 transduces the information contained in embossed characters on a credit card into electrical information. A sensor unit in accordance with the preferred embodiment of the invention is illustrated schematically in FIG. 2 of the drawings. It is the device into which the credit card to be checked is placed. In accordance with one preferred embodiment of the invention, the sensor unit includes a spring motor 40. Energy is stored in the spring motor 40 as a credit card 42 is pushed into the machine. When the card is released, the energy stored in the spring motor 40 supplies power to a drive mechanism illustrated schematically by rollers 43, used to slowly push the card out of the machine toward the operator. The spring motor 40 is speed controlled by the governor 44, causing the card to move out of the machine at a constant, desired rate. The spring motor, governor and drive mechanism are devices well known in the art and, accordingly, a detailed showing of these devices is not made.

Figures 2, 3, 4:
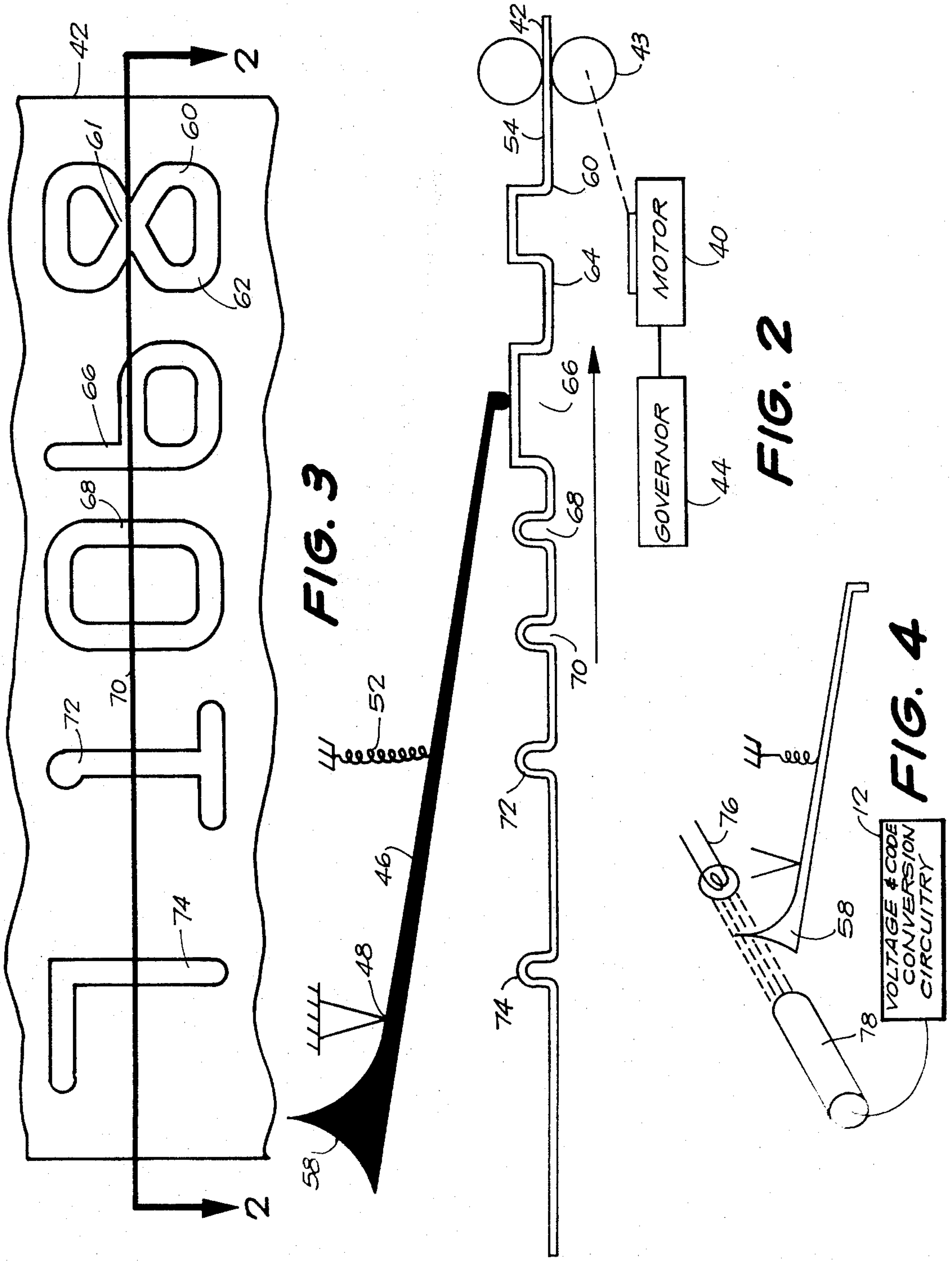
FIG. 2 is a view illustrating the principles of the sensor mechanism in accordance with the preferred embodiment of the invention.
FIG. 3 is a plan view of a portion of a credit card having embossed characters formed thereon.
FIG. 4 is a perspective view illustrating additional details of a sensor mechanism in accordance with the preferred embodiment of the invention.

The sensor unit also includes nine of the feelers 46, only one of which is shown in FIG. 2 of the drawings. In accordance with the embodiment of the invention shown, feeler 46 is an elongated member supported for pivotal movement about an intermediate point 48. Feeler 46 includes a nib 50 which engages the surface 54 of the card as the card is moved along a path in which the nib will traverse a path traverse to the letters. In accordance with the specific example of the invention described herein, the nib is of a width equal to one seventh of the character height. A spring 52 is provided which forces the nib 50 against the upper surface 54 of a credit card 56. A flag 58 is provided at the opposite end of the feeler 46. The flag is preferably shaped such that its width at various points along its height vary exponentially rather than linearly. Shaping the flag 58 in that manner facilitates detection of movement of the flag. It will be noted that in accordance with the preferred embodiment of the invention, movement of the flag rather than the absolute position of the flag is detected.

Referring to FIG. 3 of the drawings, there is shown a portion of the credit card on which the numbers 7,1038 appear. In the example shown, letters are in a Farrington 7B font commonly used on credit cards. It will be appreciated, however, that the present invention can be used with different fonts of type. The credit card 42 shown in FIG. 2 of the drawings reflects the variations in surface of the card along the line 2—2 of FIG. 3 for the particular letters shown. Thus, as the card 42 is moved in the direction shown by the arrow of FIG. 2 with the hub 50 of the feeler 46 moving along line 2—2 of FIG. 3, the flag 58 will be lowered as the nib passes over the raised portion 61 where lines 60 and 62 defining the sides of the lower loop of FIG. 8 cross. The flag 58 will be lowered for a greater period of time as the nib passes over raised portion 66 defining the upper part of the loop of the 6. Similarly, flag 58 will be lowered as the feeler passes over the raised lines 68 and 70 comprising the sides of the letter 0. The raised portion 61 of the character 8 is of greater width than raised portion 68 and 70, but of lesser width than raised portion 66 and centered. The flag 58 will then be lowered as nib 50 passes over the raised line 72 comprising the vertical portion of the letter 1. In this instance, the raised line is in the center part of the letter. Still another lowering of the flag will be produced as nib 50 passes over the raised portion 74 comprising the side of the character 7. In this instance, the raised portion is at the right hand edge of the character matrix.

As shown in FIG. 4 of the drawings, each of the feelers 46 has associated therewith a light source 76 and a photo cell 78 on which light from source 76 impinges. The flag 58 on the end of the associated feeler is positioned to intercept the light path between the bulb and the photo cell. The portion of the excitation-current curve of the device 78 at which it is normally operated is essentially exponential in shape. By making the width of the flag vary exponentially, as described above, the output of the device 78 is caused to be linearly proportional to displacement of the flag. The output of the photo cell is supplied to the voltage and code conversion circuitry 12 which produces output pulses responsive to movement of the flags 58. In accordance with the specific example of the invention described, a downward movement of the flag 58, resulting in an increased amount of light impinging on the photo cell, will result in a positive pulse. On the other hand, an upward movement of the flag, as is produced when the nil of the feeler falls between raised lines, will reduce the amount of light impinging on the photo cell and the detector circuit of the voltage and code conversion circuit will provide a negative output. However, in accordance with the preferred embodiment of the invention, only positive going pulses produced when the flag is lowered at the edge of a raised line are utilized.

Figure 5A:
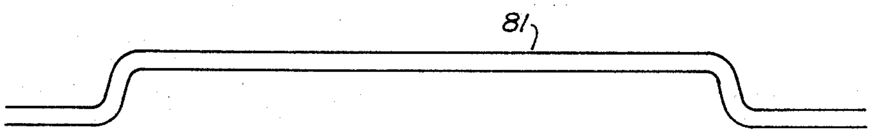
FIGS. 5*a* and 5*b* are cross sectional views of portions of different numbers.
Figure 5B:
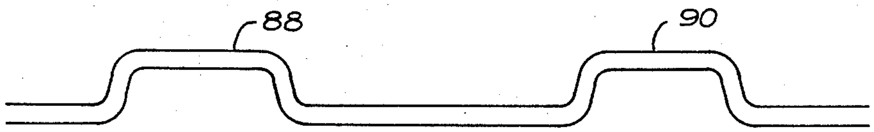
Figure 6A:
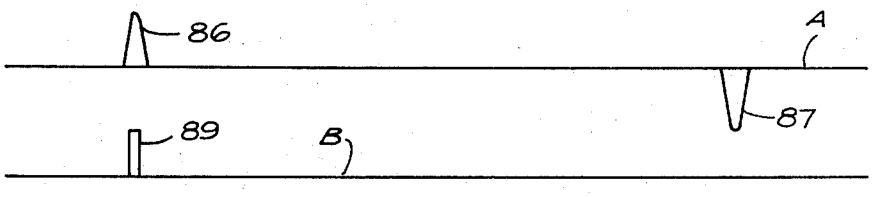
FIGS. 6*a* and 6*b* are curves illustrating the electrical signals produced by the circuitry of the preferred embodiment of the invention as the feeler traverses a path across portions of the figures shown in FIGS. 5*a* and 5*b;*
Figure 6B:
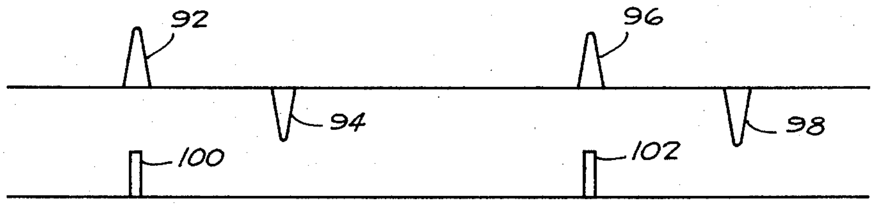

For example, referring to FIG. 5*a* of the drawings, there is shown in cross section a raised embossed portion 81 comprising the mid-section of the letter 2. When the letter 2 is sensed by the sensor of the present invention, a positive pulse 86 is produced at the leading edge of the mid-section line and a negative pulse 87 is produced at the trailing edge, as shown in Curve A of FIG. 6*a*. However, only positive going pulse 89 is transmitted to line 16, as shown in Curve B of FIG. 6*a*. FIG. 5*b* illustrates in cross section the raised line encountered as the feeler moves across the mid-section of character 0. Thus, as shown in FIG. 5*b* of the drawings, the feeler would cross two lines 88 and 90 of lesser width than the raised line 81 associated with the mid-section of the number 2. A positive pulse 92 will be produced when the sensor first detected the leading edge of the raised line 88. A negative going pulse 94 would be produced at the trailing edge of the raised line 88.

It will be noted that both pulses 92 and 94 are produced at a point indicating the line is at the side of a letter. As the feeler crosses the raised line 90, additional pulses 96 and 98 are produced. However, only positive pulses 100 and 102 are transmitted to line 16 with the time relationship of pulses 92 and 96 indicating that they are produced at opposite edges of a letter which, along the particular transverse line, spans the maximum letter width. In view of the foregoing, it can be seen that positive going pulses are only produced when the nib of the feeler is raised as it encounters the leading edge of a raised line. So long as the position of the flag does not change, an output pulse is not provided nor is an output pulse provided to line 16 when the nib falls at the trailing edge of a line.

Figure 7:
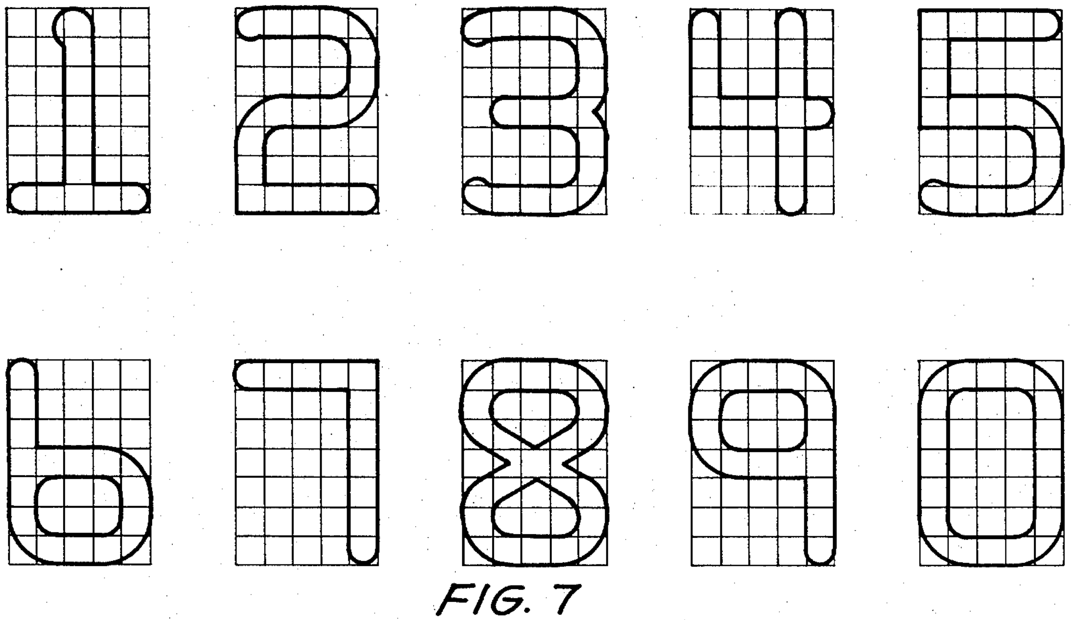
FIG. 7 illustrates a font of Farrington 7B type.

The Farrington 7*b* font is the most popular credit card font presently used. Accordingly, the invention is described with reference to detection of the Farrington 7B font as shown in FIG. 7 of the drawings. However, it will be appreciated that the apparatus and method of the present invention can be used with virtually any font as the system can handle any reasonable set of patterns which may be presented to it.

Figure 8:
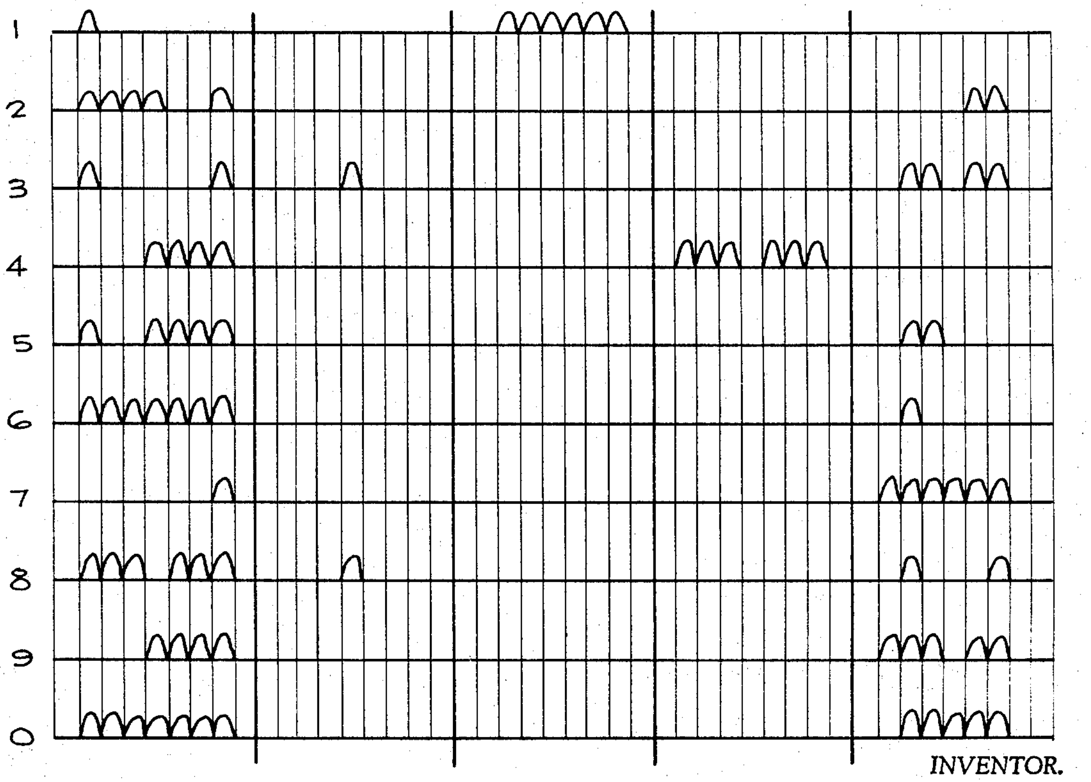
FIG. 8 illustrates the pattern of electrical signals produced by the sensor of the present invention for different numeric characters.

In the Farrington 7B font, each character is drawn in a 5 × 7 matrix. Preferably, nine sensors are used with the first and ninth sensor passing immediately below and immediately over the letters and remaining seven feelers passing across the letters. Provision of the extra two feelers makes it possible to accommodate some misplacement of the card or the position of the characters on the card. The pulse pattern produced for each letter is shown in FIG. 8 of the drawings wherein the five primary vertical columns represent the five vertical columns of the 5 × 7 matrix. The nine vertical columns associated with each of the primary vertical columns are associated with the nine horizontal paths traversed by the feelers. Thus, when the feelers are at the left edge of each of the letters of the font with the card being driven to the left, feeler 46–2 (the second from the bottom) will be raised causing an output positive pulse to be produced if the character is a 1. At the second position of the matrix, a positive output pulse is not produced by the character 1 as none of the flags will move. It will be noted, in this regard, that flag 58–2 will remain lowered with the remainder of the flags being raised. At position 3, the flags associated with the horizontal tracks 3 through 8 will be lowered producing positive output pulses.

At position 4, the flags 58–3 through 5–8 will have returned to the raised position. However, indication will not be provided since only positive going pulses are transmitted. An output signal does not appear in position 5 as none of the flags are lowered, although flag 58–2 will be raised as the feeler passes over the trailing edge of the embossment establishing the base of the character 1.

The pulse pattern produced as the nine feelers move over the embossed characters 2 through 0 are also shown in FIG. 8 of the drawings. It will be noted that the pattern for each character is unique and highly distinctive.

Clock pulses are produced by the sensor in synchronism with the data pulses for use in data processing. An exemplary means for producing the clock pulses is shown in FIG. 4*a* of the drawing wherein a plate 11 having light transmitting aperatures 13 is positioned between a light source 15 and a photo cell 17. The output of the photo cell is a negative going pulse when light passes through one of the aperatures. The spacing between the aperatures 13 is the same as the spacing between characters. The plate is positioned relative to the card and moved with the card such that a clock pulse is produced immediately prior to the time that the feelers begin to pass over any of the five columns of a character. Thus, five clock pulses are produced as the feelers traverse the parallel paths across each character.

Figure 9:
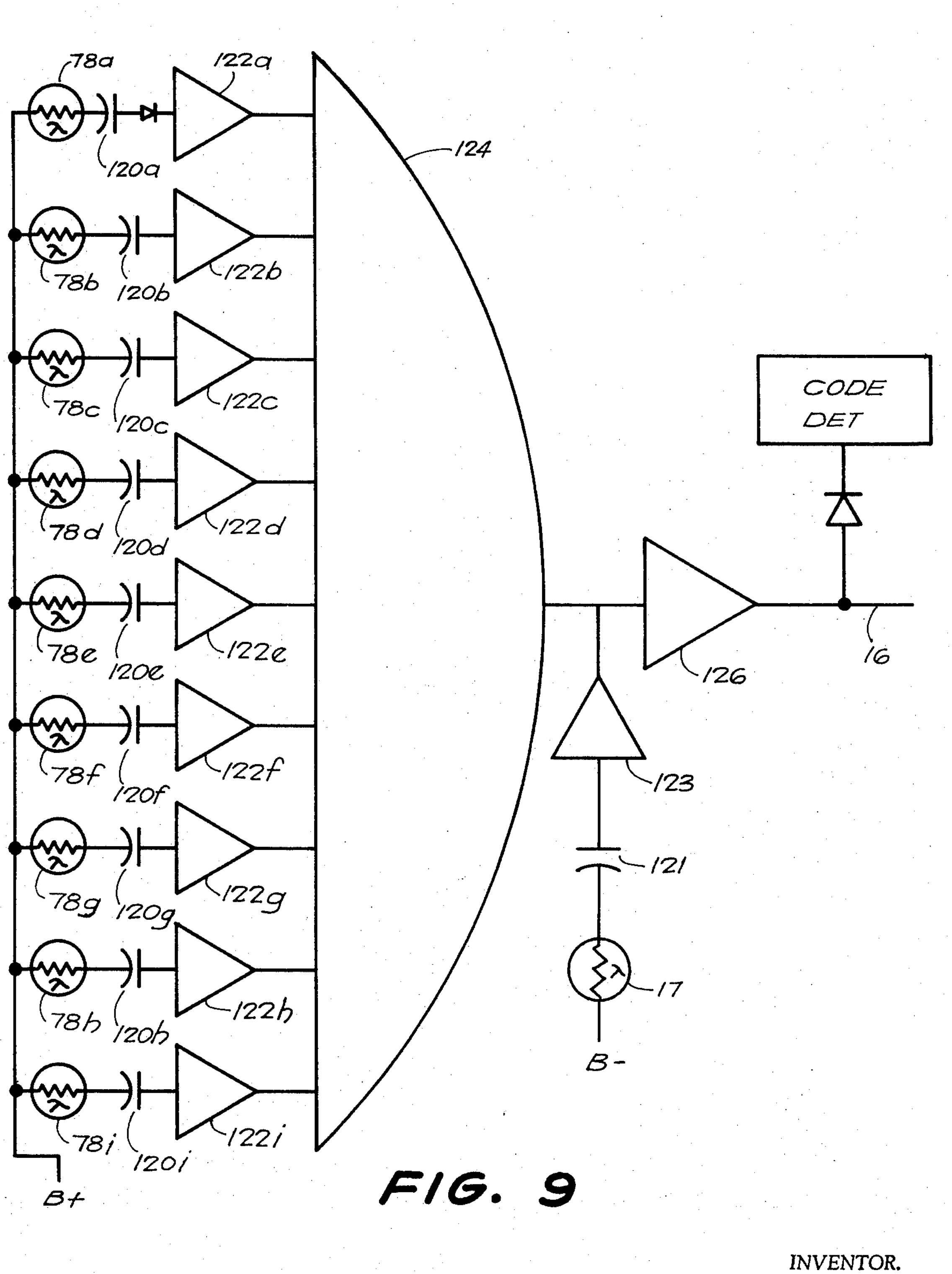
FIG. 9 is a block diagram illustrating electrical circuitry associated with the sensor of the present invention.

The voltage and code conversion circuitry 12 utilizes conventional circuits suitably arranged as shown in FIG. 9 of the drawing to change the output of the sensor unit into pulses which are useable within a telephone transmission network. Thus, one side of each of the photo cells **78*a* – 78*i* associated with the nine feelers 46*a* – 46*i* is suitably connected to a common source of d.c. supply voltage. The other side of each of the photocells is coupled through capacitors 120*a* – 120*i* to the input of an associated amplifier 122*a* – 122*i*. The outputs of the nine amplifiers 122 are commonly connected to the nine inputs of an OR gate 124. The output of the OR gate 124 is applied to the input of an amplifier 126 whose output is connected to line 16. It will be noted that as the resistance of each of photo sensitive devices 78 changes responsive to movement of the associated flag, the change in current produced will be differentiated by the capacitor 120 to produce positive going pulses when the resistance is decreased as a result of the flag being lowered and negative going pulses when the resistance of the photo cell is increased as a result of the flag being raised. Either the amplifier 122, or the OR gate 124 can be biased to pass only positive going pulses in order that only positive pulses will be applied to the line 16. The photo cell 17 is connected through capacitor 121 and amplifier 123 to the input of amplifier 126 for supplying the negative going clock pulses to line 16. The amplifiers 122 and 123 are provided for the purpose of increasing the signal level of the pulses to levels which can be processed with less criticality of design and the amplifier 126 serves the function of providing any desired output level on the line 16** and also provides an essentially square wave output which is more easily processed in the associated computer circuitry. It will be noted that the voltages required on various leased telephone lines can vary from 10 volts to in excess of 100 volts.

It can be seen that the outputs of the nine photo cells **78*a* – 78*i* are commonly connected through the OR gate to the input of the amplifier 126. It is, therefore, necessary that the outputs of the nine photo cells be applied sequentially to the input of the amplifier 126 rather than as a group. The preferred manner of accomplishing the desired sequential output is to align the nibs of the feelers along a line inclined to the letters such that a built-in time delay is provided between the instant which nib 50*a* would be raised by a single embossed line and the time at which nib 50*i*** would be raised. The amount of inclination must be chosen in regard to the resolution desired. Preferably, the data pulses are produced in a small amount of the time required for the pulses to traverse one column of a character to to minimize interference from the clock pulses. In general, an inclination of ten degrees or even less is sufficient for this purpose. The above described mechanical arrangement is the preferred method for obtaining the desired sequency in view of its extreme simplicity. However, other means of sequencing can be used. For example, the nine outputs of the photo cells could be applied to the parallel inputs of a series parallel shift register and then the data shifted out in serial form.

Figure 11A:
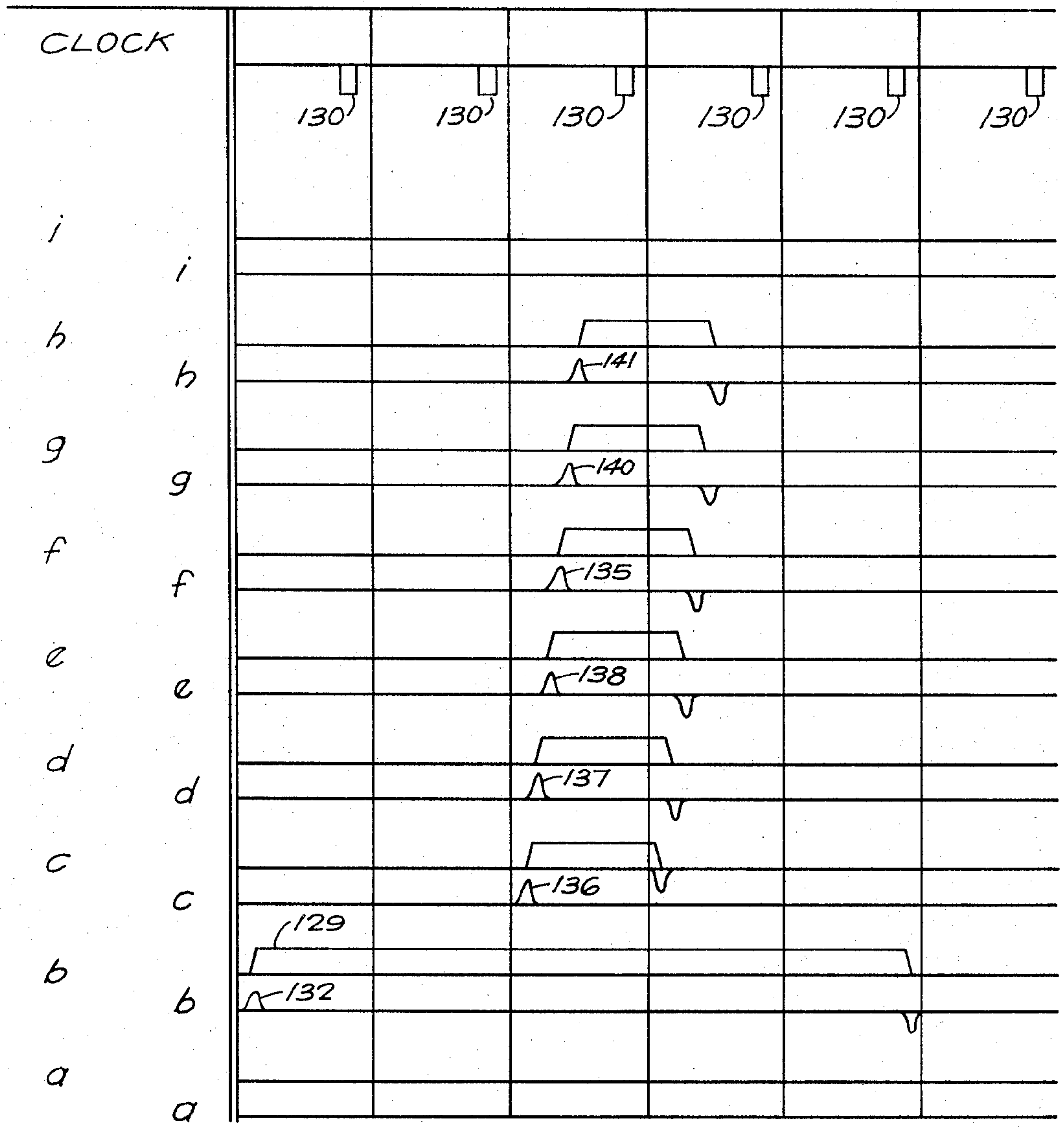
FIGS. 11*a* and 11*b* show the pulse formations produced by the invention.
Figure 11B:
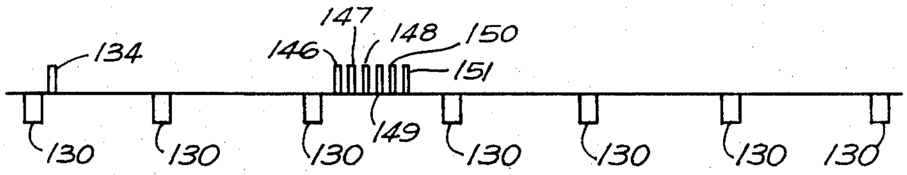

The above is further illustrated in FIGS. 11*a* and 11*b* of the drawings showing five vertical columns corresponding to the five columns of a 7 × 5 letter and a sixth column corresponding to a space between letters. It can be seen that a clock pulse 130 is produced during the space of each column. There is also illustrated in FIG. 11*a* the width of the embossed lines along the paths traversed by each feeler and the pulses produced by each feeler as it is raised and lowered by a character 1. Thus, in FIG. 11*a* pulses are not produced by nibs 50*a* and 50*i*. The embossed character passes between these two feelers and does not move them. Nib 50*b* is raised when it strikes the base 129 of the character 1 producing a positive pulse 132 shown in the first column. This positive pulse is processed by the voltage and code conversion circuitry and both the clock pulse 130 and a positive pulse 134 are applied to line 16. None of the feelers are displaced in the second column accordingly only a clock pulse 130 is produced. In the third column, each of the nibs 50*c* – 50*h* are displaced sequentially producing positive pulses 136 – 141 which are applied to line 16 as pulses 146 – 151 shown in FIG. 11*b*. Negative going pulses are produced as the nibs 50*c* – 50*h* are lowered at the trailing edge of the vertical portion of the letter 1. However, as described previously, the negative going pulses are not applied to the line 16 and only a clock pulse is applied. In column 5, a negative going pulse is produced as nib 50*b* falls. Again, only a clock pulse is applied to line 16.

The sensor described above has utility in applications other than the system of the present invention. It is a preferred type of sensor in that it is relatively simple and, therefore, inexpensive to manufacture and maintain. It provides the function of transforming information contained in the embossed characters on a credit card or other device into electrical information in a very expedient manner and provides the electrical information in easy to use form.

Referring again to FIG. 1 of the drawings, it will be seen that the output of the voltage and code conversion circuit 12 is applied to a one input of a data concentrator 14. The data concentrator can be anyone of several manufactured by different manufacturers which perform the well-known function of receiving data from a source over a substantial period of time and then feeding the data to a using computer at a very fast rate in order that maximum utilization of the computer can be obtained. It will also be noted that the data concentrator will be capable of accepting information on many lines.

The output of the data concentrator will be a series of pulse groups. It is necessary that these pulse groups be converted to binary form representing a particular character prior to the information being supplied to the computer. In accordance with the present invention, this conversion is accomplished by the character recognition unit 20 shown in greater detail in FIGS. 12*a* and 12*b* of the drawings.

Figure 13:
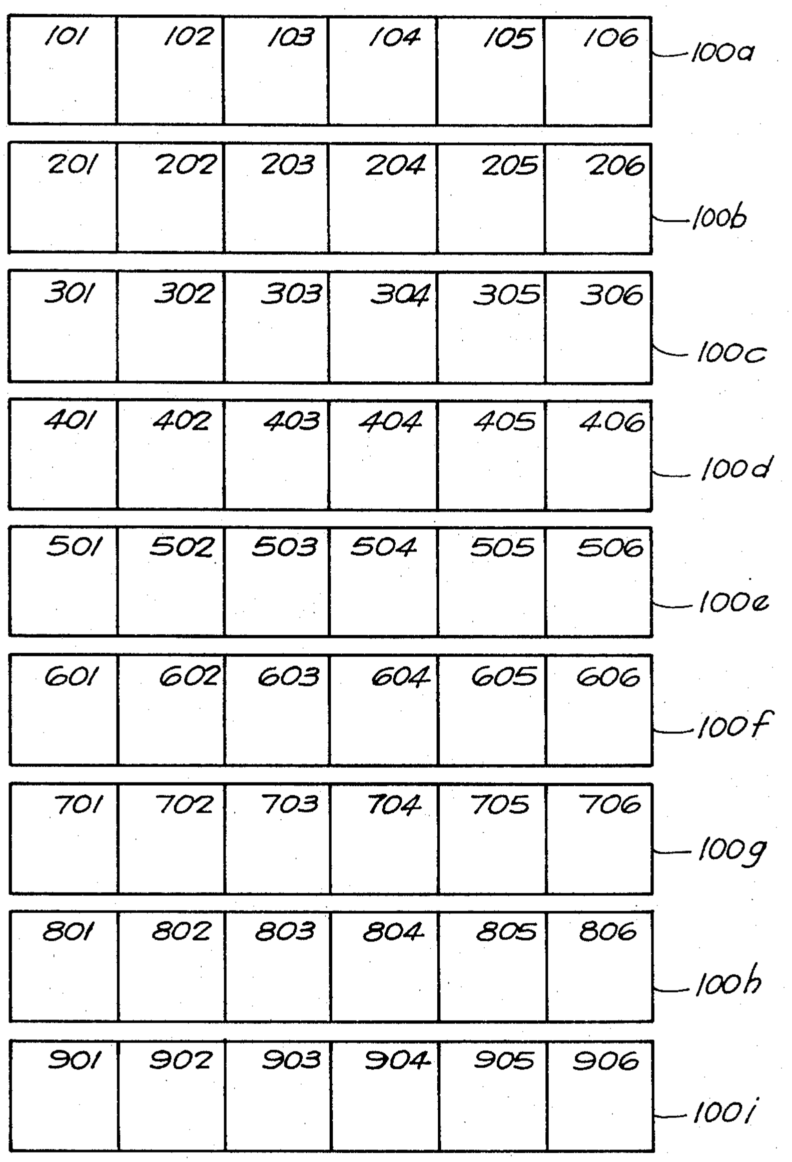
FIG. 13 illustrates in short form the preferred manner in which discrete frequencies are assigned to each stage of the temporary memory used in the present invention.

The preferred character recognition unit comprises a number of shift registers 100*a* – 100*i* equal to the number of feelers used. Each of the shift registers incorporates a number of stages greater than the number of vertical rows in each letter by 1. In the specific example shown wherein the letters are of 7 × 5 matrix, each of the shift registers will include six stages with the sixth stage indicating a break between letters. Each of the stages of each of the shift registers is assigned a unique oscillator as shown diagrammatically in FIG. 13 of the drawings. Each oscillator operates at a different frequency. In the example shown in FIG. 13, it can be seen that the least significant digit of each frequency is the same for each column and the most significant digit is the same for each row. It will be noted that the range of frequencies required will depend upon the size of the matrix which would be as large as 13 × 20 or a total of 260 frequencies for alpha numeric character sets and as small as 9 × 6 or a total of 54 for a simple numeric character set as illustrated in the specific example of the invention shown.

Figures 12A, 12B:
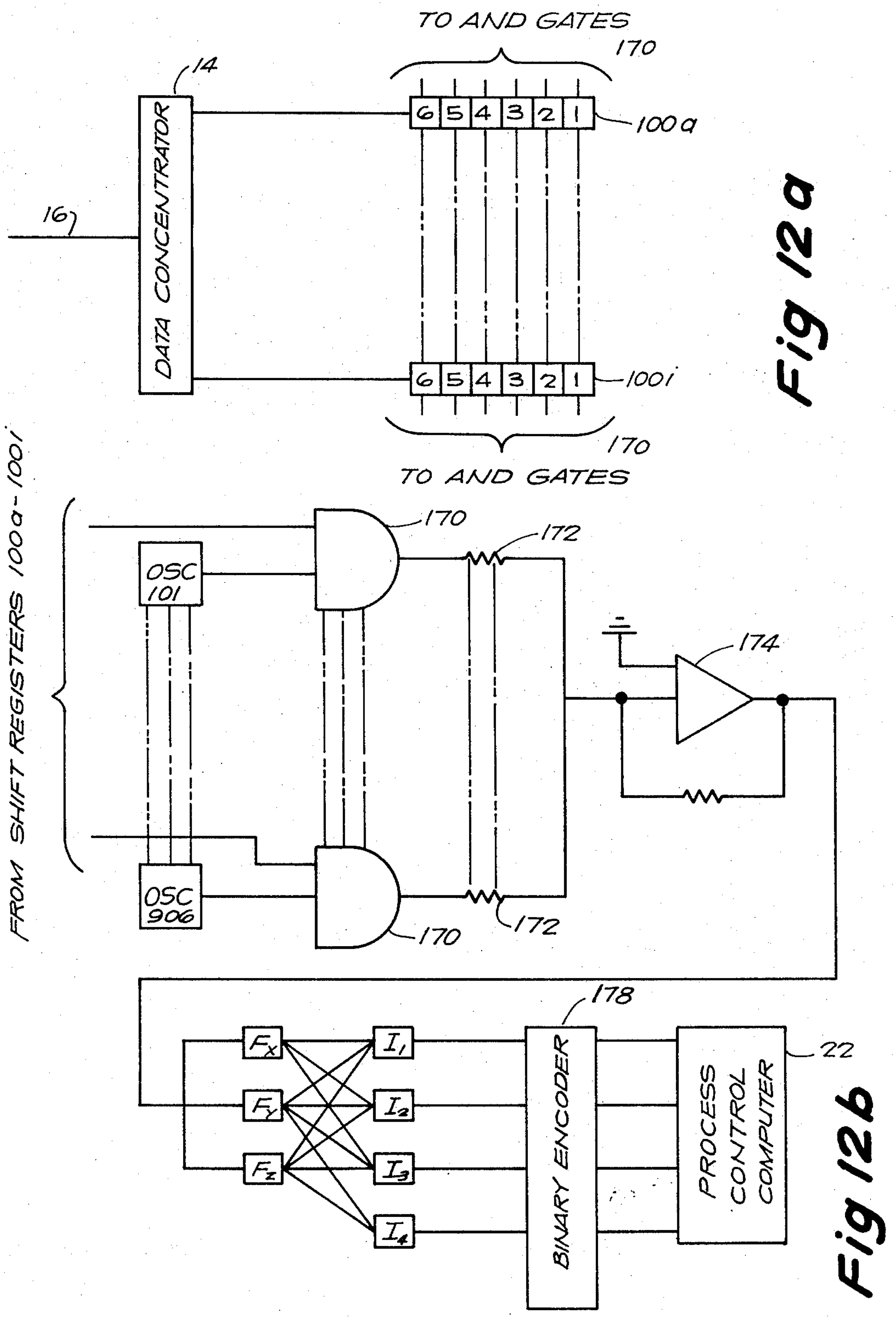
FIGS. 12*a* and 12*b* are block diagrams illustrating a character recognition unit in accordance with the preferred embodiment of the invention.
Figures 14, 14A:
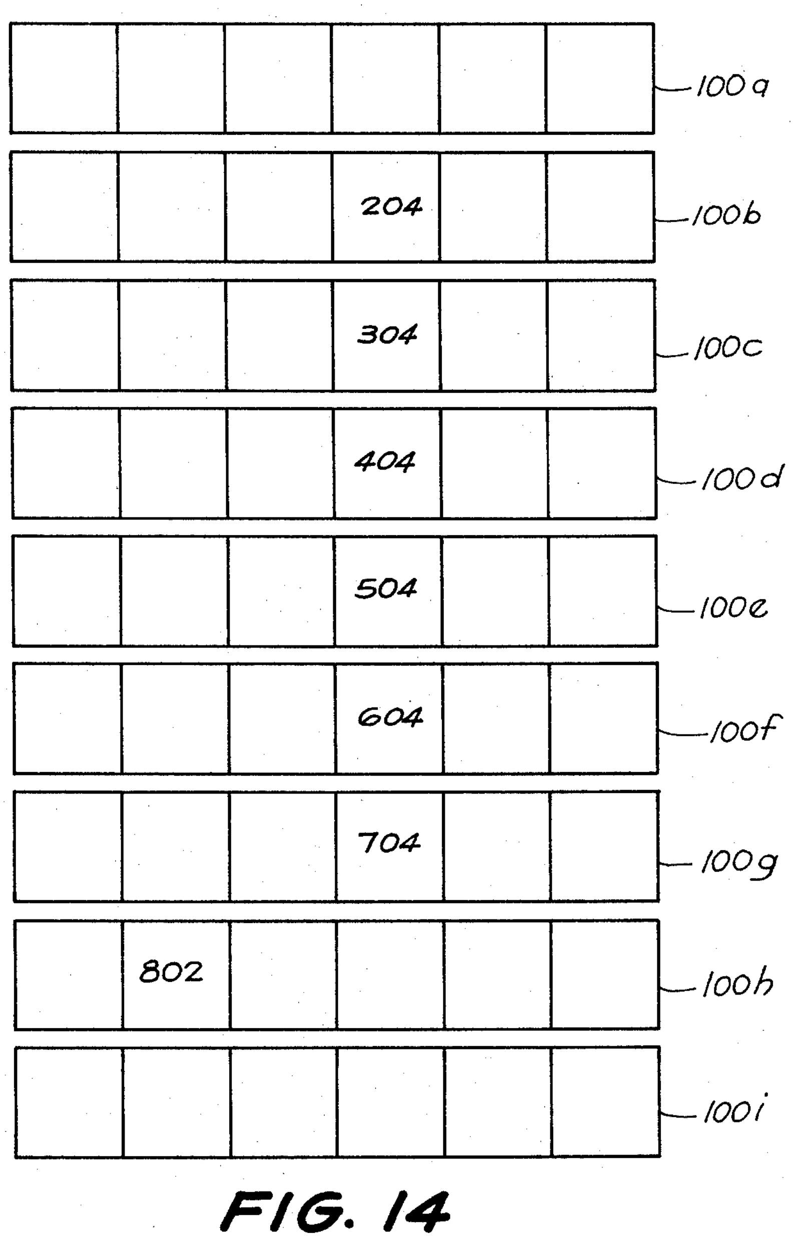
FIG. 14 illustrates the bits stored in the temporary memory in the numeric character 1 as being read.
FIG. 14*a* is a chart illustrating the two sets of unique chords associated with numeric character 1.

Referring to FIG. 12*b* of the drawings, the output of each of the oscillators is fed through an AND gate 170 and a summing resistor 172 to the input of an operational amplifier 174. The gates 170 are normally disabled, but are enabled when an enabling signal is applied to the gate from the associated stages of one of the shift registers. Thus, when, for example, the numeric character 1 is sensed, the AND gates connected to stages of the shift registers shown in FIG. 14 would be enabled, permitting the frequencies indicated on the matrix of FIG. 14 to be applied to the input of the operational amplifier. As a result of the mixing of the frequencies, two chord sets A and B will be produced as shown in FIG. 14*a* with each of the beat frequencies having a relative amplitude as indicated. It can be further seen that the first chord set recognizes horizontal data and the second chord set recognizes vertical data. From the particular example shown, the horizontal line is shown to be low and to the left and the second card set detected the fact that there was one vertical column which is centered.

The output of the operational amplifier is applied to the inputs of a plurality of filters. The outputs of the filters are interconnected with a plurality of integrators I*a* – I*i*. The integrators can be of any suitable, conventional type such as a capacitor and operational amplifier interconnected to function as an integrator. When the output at one of the integrators attains a predetermined level, it indicates the presence of a particular numeric character. The outputs of the integrators are applied to a binary encoder 178 whose output responsive to inputs from the integrators is the particular numeric character in binary form.

Referring again to FIG. 1, the output of the binary encoder is the output of the character recognition unit, which is applied to the input of the small process control computer. The small process control computer 22 can be programmed to perform any desired function depending upon the information furnished, such as checking the credit card number against a list of bad credit cards or, if charge information is furnished to the computer, determining if the amount to be charged is within the credit limitation. The control computer 22 provides an output signal to the data concentrator indicating either that a charge should be accepted or rejected. Information from the control computer 22 is applied through the data concentrator 14 to the line 16. The line 16 is connected through a diode to a code detection circuit, which can suitably be a double pulse detector circuit of a type well known in the art. Dependent upon character of the information applied to the code detector responsive to the information furnished to the computer, an appropriate output device can be activated.

Figure 10:
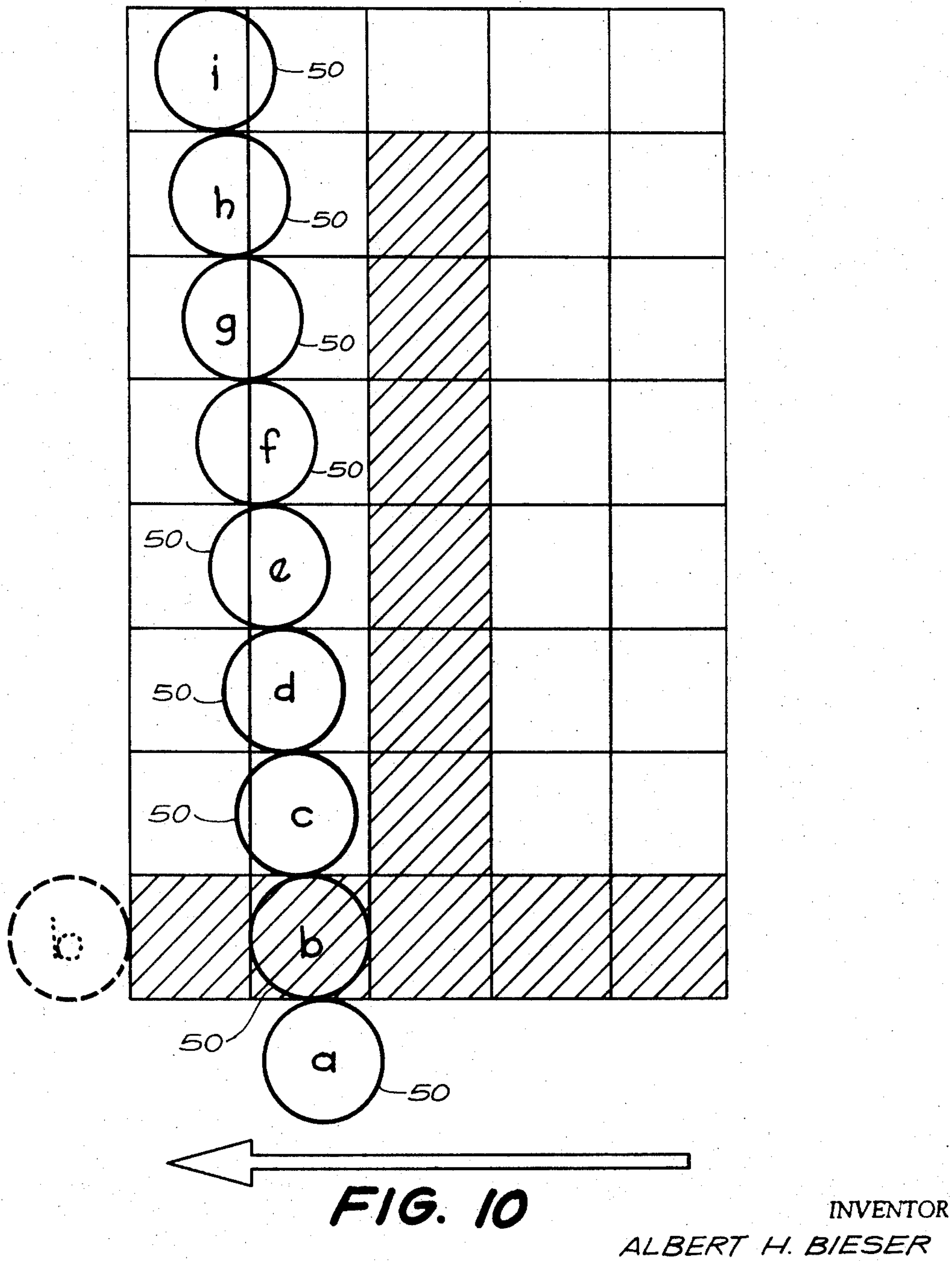
FIG. 10 is a view diagrammatically illustrating the manner in which the feelers employed in the sensor unit of the present invention can be aligned along a line inclined to vertical in order to produce sequential pulses.

In the specific embodiment of the invention shown, it is necessary that an output from the amplifier 174 can not be applied to the filters until all the data associated with the particular character is stored in the shift registers 100*a* – 100*i*. It can be seen from reference to FIG. 7, that in the specific Farrington 7B type shown as the card is moved in the direction indicated by the arrow of FIG. 10, one of the nibs 50*a*, 50*b*, 50*h* and 50*i* will always be displaced at the first column. Accordingly, when a data bit is stored in the first stage of one of the shift registers 100*a*, 100*b*, 100*h* and 100*i*, it will indicate that after six more columns have been traversed all of the data associated with the particular character is stored in the bank of shift registers.

Figures 15, 16, 17:
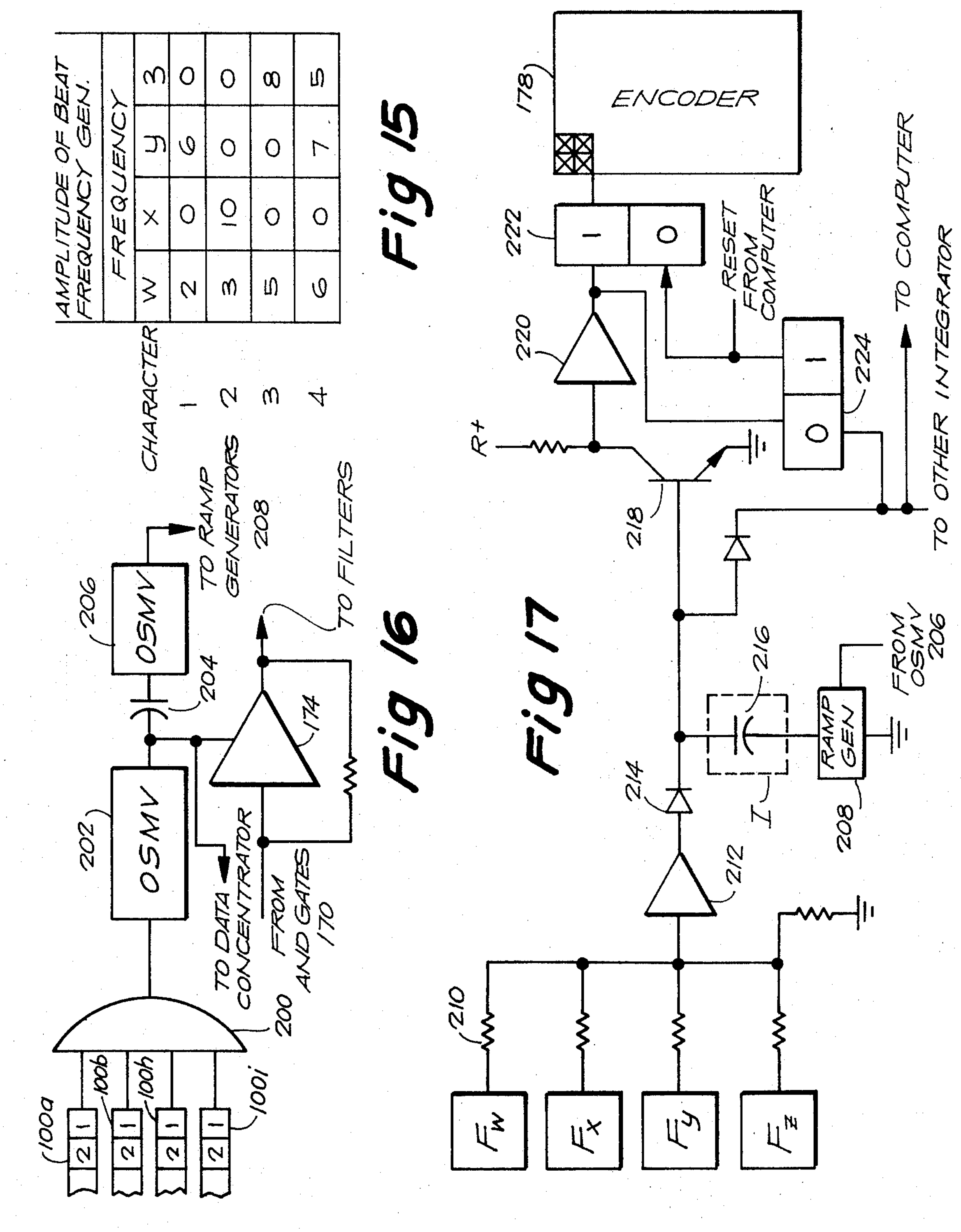
FIG. 15 is a chart illustrating the beat frequencies produced for a particular set of characters; and, FIGS. 16 and 17 are block diagrams illustrating additional details of the character recognition unit.

Referring now to FIG. 16, there is illustrated schematically a portion of the character recognition unit in which stage 1 of each of the shift registers 100*a*, 100*b*, 100*h* and 100*i* are connected to the input of an OR/Gate 200. The output of the OR/-gate 200 is connected to the input of a one shot multivibrator 202 which produces a positive going pulse of predetermined duration in response to an input signal from the OR/gate. The output of the one shot multivibrator is connected to the operational amplifier 174 for enabling the amplifier 174 only during the duration of the output pulse from the one shot multivibrator 202. The output of the one shot multivibrator 202 can also be applied to the data concentrator to prevent additional data being applied to the shift registers during the duration of the pulse from the one shot multivibrator 202. Thus, the output of the oscillators will not be applied to the inputs of the filters except during the duration of the output of the one shot multivibrator 202 and during this period of time additional data will not be applied to the shift registers.

The output of one shot multivibrator 202 is also applied through a differentiating capacitor 204 to a second one shot multivibrator 206. The output of the one shot multivibrator 206 is a pulse of predetermined duration which is applied to a plurality of ramp generators 208 for reasons which become apparent as the description of a preferred embodiment of the invention continues.

There is shown in FIG. 17 the interconnections between the filters $F_w - F_z$ and the encoder 178. Thus, in accordance with the specific example of the invention shown, the outputs of each of the filters $F_w - F_z$ is connected through a summing resistor network 210 to the input of a current amplifier 212. The output of the current amplifier is connected through a diode 214 to the integrator I. In the specific example shown, the integrator I merely comprises a capacitor 216. The capacitor 216 is connected to ground through the ramp generator 208. The over terminal of the capacitor is connected not only to the anode of the diode 214, but also to the input of a transistor 218 which comprises an amplifier which is operated only when the charge on the capacitor 216 attains at least a predetermined level. The output of the amplifier comprising the transistor 218 is connected through a digital amplifier 220 to the set input of a flip-flop 222. When the flip-flop 222 is set responsive to an output from the amplifier comprising transistor 218, a positive pulse is applied to the encoder 178. The output of the amplifier 220 is also applied as a set pulse to a reset flip-flop 224.

When the flip-flop 224 is set, ground is applied to each of the integrators permitting the capacitors 216 to discharge to a predetermined level and causing the amplifier comprising transistor 218 to turn off. It will be noted that upon this occurrence, the system will be in condition to accept additional data from the data concentrator 14. Also, when flip-flop 224 is set, the signal is applied to the computer signalling it that information is available in the encoder 178 to be read by the computer. After the computer has read the information stored in the encoder, a signal is applied from the computer to reset flip-flops 222 and 224.

A circuit as shown in FIG. 17 is associated with each of the integrators. Accordingly, a signal is applied to the encoder 178 only from the integrator which first attains a predetermined level. An output from a particular integrator indicates that a particular character is present and permits the encoder to provide a binary output representative of that character to the computer. It is important to note that the output from the filters will generally not be of a level sufficient to cause the output of the integrator to attain the predetermined level within the duration of a pulse output from the one shot multivibrator 202. Accordingly, when the one shot multivibrator 206 is operated, the ramp generators 208 associated with each of the integrators are enabled at a common time by the output from the one shot multivibrator 206. The ramp voltages generated increase the potential the inputs to the transistor 218 at common rates in order that it is the integrator which was charged to the highest voltage level by the filter outputs will be the first to attain the predetermined voltage level.

Statistical methods for determining the probability of particular sets of frequencies indicating a particular character are well known. However, by way of providing an improved understanding of the invention, an example will be given in which, for simplicity, it is assumed that there are four characters in a set of characters to be recognized and their beat frequency outputs are as shown in the table of FIG. 15, assuming perfect characters which are perfectly positioned.

The number of integrators used will be equal to the number of characters to be recognized. Thus, in a numeric set only ten integrators would be required. The minimum number of filters required would be $n$ where $2^n$ is greater than the number of characters. However, the minimum number of filters could be used only in those instances in which there was a minimal amount of noise present and wherein there was no possibility of misalignment of the card relative to the sensing mechanism.

For maximum resolution, the number of filters used would be equal to the number of discrete beat frequencies produced and there would be applied to each integrator an output from each filter of each beat frequency which would be present or produced by a character in both the aligned and misaligned conditions. However, normally a much lesser number of filters will be used with the number of filters used only being sufficient to tune the filter-integrator matrix to provide a desired degree of resolution. For example, in practice it has been found that nine filters are practical for a numeric character set. The number of filters required will be determined by the noise present in the system and will vary depending upon the resolution required.

It is obvious that the beat frequencies appearing and the relative amplitude of the beat frequencies are the two areas of importance. Also, the importance of the appearance of any given beat frequency is inversely proportional to the number of characters containing that beat frequency.

In the example, all characters contain the beat frequency "W" and its occurrence is only slightly useful. Thus, while the presence of the beat frequency "W" is helpful in determining that a character exists, it is not helpful in choosing between the four possible characters. By comparison, the occurrence of the beat frequency "X" positively identifies an unknown character as a 2. Statistically, the position weighing factor to be applied to any particular beat frequency for any particular character is the ratio of the number of characters divided by the number of characters in which the beat frequency appears. Thus, the position weighing factor to be applied to beat frequency "W" to determine the probability that the character is a 1 is 4/4 since all characters expect the occurrence of the beat frequency "W." Similarly, the position weighing factor applied to the beat frequency "X" or the character is 4/1. Also, the positive contribution of the expected beat frequencies has its negative counterpart in the form of the presence of unexpected beat frequencies. The position weighing factors applied to the unexpected beat frequencies are generated exactly as described above except that a minus sign is attached to the amplitude factor.

Many character recognition systems make a binary decision and say that any amplitude above some absolute level is a 1 and that all others are zeros. These systems work well only when the characters are perfect and the circuit noise is very low. When the characters are degraded or the circuit noise is high, the apparatus must be able to consider relative values. For example, a strong noise burst might make the character 1's output W = 5, X = 3, Y = 9 and Z = 3. Similarly, attenuation in the system might cause the output of the character 1 to be W = 0.5, X = 0, Y = 2 and 0 = 3. It can, therefore, be seen that not only absolute differences but also ratios may vary. For example, in respect to the character 1, the beat frequency "W" should be relatively small with respect to beat frequency "Y" and beat frequencies "X" and "Z" should be very small by comparison with "Y." It can, therefore, be seen that the amplitude weighing factor is a function of the average signal received. For the character 1, the average expected amplitude for a perfect character is $$\frac{2+0+6+0}{4}=2$$

The amplitude waiting factor for the beat frequency "Y" and the character 1 for recognition purposes is then 6/2 = 3.

Thus, the relative probability that any given chord is one of the given characters as shown in the equations:

| Character | W | X | Y | Z |
|---|---|---|---|---|
| 1 | $=\left(\frac{4}{4}\right)\left(\frac{W}{2}\right)+$ | $\left(\frac{4}{3}\right)\left(\frac{X}{-2}\right)+$ | $\left(\frac{4}{2}\right)\left(\frac{Y}{2}\right)+$ | $\left(\frac{4}{2}\right)\left(\frac{Z}{-2}\right)$ |
| 2 | $=\left(\frac{4}{4}\right)\left(\frac{W}{3}\right)+$ | $\left(\frac{4}{1}\right)\left(\frac{X}{-3}\right)+$ | $\left(\frac{4}{2}\right)\left(\frac{Y}{3}\right)+$ | $\left(\frac{4}{2}\right)\left(\frac{Z}{-3}\right)$ |
| 3 | $=\left(\frac{5}{4}\right)\left(\frac{W}{3}\right)+$ | $\left(\frac{4}{3}\right)\left(\frac{X}{-3}\right)+$ | $\left(\frac{4}{2}\right)\left(\frac{Y}{3}\right)+$ | $\left(\frac{4}{2}\right)\left(\frac{Z}{-3}\right)$ |
| 4 | $=\left(\frac{4}{4}\right)\left(\frac{W}{6}\right)+$ | $\left(\frac{4}{3}\right)\left(\frac{X}{-6}\right)+$ | $\left(\frac{4}{2}\right)\left(\frac{Y}{6}\right)+$ | $\left(\frac{4}{2}\right)\left(\frac{Z}{-6}\right)$ |

By way of example, assume that a character centered in the recognition system produces W = 4, X = 9, Y = 1, Z = 0. The output of each integrator will then become:

$$1.\ -\left(\frac{4}{4}\right)\left(\frac{4}{2}\right)\left(\frac{4}{3}\right)\left(\frac{9}{2}\right)+\left(\frac{4}{2}\right)\left(\frac{1}{2}\right)-0=2-0+1=-3$$

$$2.\ =\left(\frac{4}{4}\right)\left(\frac{4}{3}\right)+\left(\frac{4}{1}\right)\left(\frac{9}{3}\right)+\left(\frac{4}{2}\right)\left(\frac{1}{3}\right)-0=\frac{4}{3}-12-\frac{2}{3}=+12\tfrac{2}{3}$$

$$3.\ =\left(\frac{4}{4}\right)\left(\frac{4}{3}\right)-\left(\frac{4}{3}\right)\left(\frac{9}{3}\right)-\left(\frac{4}{2}\right)\left(\frac{1}{3}\right)+0=\frac{4}{3}-4-\frac{2}{3}=-3\tfrac{1}{3}$$

$$4.\ =\left(\frac{4}{4}\right)\left(\frac{4}{6}\right)-\left(\frac{4}{3}\right)\left(\frac{9}{6}\right)+\left(\frac{4}{2}\right)\left(\frac{1}{6}\right)+0=\frac{4}{6}-\frac{12}{6}+\frac{2}{6}=-2$$

The character is obviously a "2."

From the above, it can be seen that the character is obviously a 2, that is, the output of that integrator is much greater than the output of any of the other integrators.

It can be seen from the above that the frequency "W" is not significant and accordingly only filters corresponding to beat frequencies X, Y and Z are required. Further, some terms are insignificant as applied to particular characters and good resolution can be obtained by interconnecting the three filters with the four integrators as shown in FIG. 12*b*. Thus, only the filter $F_x$ tuned to beat frequency *x* is connected to integrator $I_2$. Filter $F_y$ and $F_z$ are connected to integrator $I_4$. All three filters are connected to integrators $I_1$ and $I_3$. The resistors connecting the filters to the integrators form a summing junction with the size of the resistors being chosen to provide the amplitude and position weighing factor.

From the foregoing, it can be seen that the present invention provides a relatively simple, highly reliable credit card verification system. The terminal apparatus is simple and inexpensive, promoting widespread acceptance. Transmission of data can be accomplished over low quality telephone lines, further reducing cost of implementing the system. A substantial number of functions can be incorporated into the system, if desired.

What is claimed is:

1. A credit card verification apparatus for use with credit cards having alpha or numerical characters comprising:

a. a plurality of sensor elements traversing a plurality of parallel paths across each of the characters of a credit card to be read;

b. a plurality of signal means each associated with one of the sensor elements for producing output pulses responsive to the associated sensor elements detecting at least one edge of the areas of characters traversed by said associated sensor elements;

c. the time relationship and number of such pulses associated with each character producing a unique pattern;

d. memory means responsive to said pulses for storing information bits in a temporary memory means at addresses determined by the time relationship and number of such pulses in a unique pattern associated with a character;

e. signal generating means for producing signals of discrete frequencies related to the addresses at which information bits are stored in said temporary means, f. means for mixing the discrete frequencies produced during discrete time intervals to produce unique chord sets associated with said character; and g. comparator means responsive to the digital outputs for providing an output signal indicating whether charges should be made against said card.

2. Apparatus as defined in claim 1 further including means for capturing a card being verified responsive to an output from said comparison means indicating that a charge should not be made against said card.

3. Apparatus as defined in claim 1 further including amount entry means for providing signals indicating the amount of the charge to be made to said comparison means and means responsive to an output from said comparator means indicating that the amount to be charged is in excess of a predetermined limit to indicate that the charge should not be accepted.

4. Apparatus as defined in claim 1 wherein said apparatus is adapted for use with credit cards having embossed characters formed in a surface thereof and wherein said sensor elements each comprise a feeler positioned to engage the surface of the credit card and further including means for producing relative movement between the credit card and the feelers with the feelers traversing a plurality of parallel paths across each of the embossed characters.

5. Apparatus as defined in claim 4 wherein said signal means associated with the sensor elements comprises means responsive to movement of the feelers traverse to the direction of relative movement for producing electrical pulses at the edge of each embossed area of a character.

6. Apparatus as defined in claim 1 wherein said means for detecting said unique patterns comprises encoder means responsive to the presence of particular chord sets for providing an output in binary form representative of a character associated with a particular chord set.

7. Apparatus as defined in claim 1 wherein said encoder means comprises a filter-integrator matrix comprising *n* filters tuned to the beat frequencies of the chord sets produced by the character to be sensed and *m* integrators where *m* is equal to the number of characters in a set and $2^n$ is equal to or greater than *m*.

* * * * *

UNITED STATES PATENT OFFICE
CERTIFICATE OF CORRECTION

Patent No. 3,671,717 Dated June 20, 1972

Inventor(s) Albert H. Bieser

It is certified that error appears in the above-identified patent and that said Letters Patent are hereby corrected as shown below:

Column 11, in the first line of the second chart of that column, change the line to read as follows:

$$--1 = \left(\frac{4}{4}\right)\left(\frac{4}{2}\right) - \left(\frac{4}{3}\right)\left(\frac{9}{2}\right) + \left(\frac{4}{2}\right)\left(\frac{1}{2}\right) - 0 = 2 - 6 + 1 = -3--$$

; and

Column 11, in the second line of the second chart of that column, change the line to read as follows:

$$--2 = \left(\frac{4}{4}\right)\left(\frac{4}{3}\right) + \left(\frac{4}{1}\right)\left(\frac{9}{3}\right) - \left(\frac{4}{2}\right)\left(\frac{1}{3}\right) - 0 = \frac{4}{3} + 12 - \frac{2}{3} = +12\frac{2}{3}--$$

Signed and sealed this 26th day of December 1972.

(SEAL)

Attest:

EDWARD M.FLETCHER,JR.
Attesting Officer

ROBERT GOTTSCHALK
Commissioner of Patents